United States Patent
Lentz et al.

(10) Patent No.: US 11,080,924 B2
(45) Date of Patent: Aug. 3, 2021

(54) OPTIMIZED COMPUTATION OF PERSPECTIVE INTERPOLANTS

(71) Applicant: Samsung Electronics Co., Ltd., Suwon-si (KR)

(72) Inventors: Derek Lentz, Reno, NV (US); Yevgeniy Urdenko, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 16/559,616

(22) Filed: Sep. 3, 2019

(65) Prior Publication Data

US 2020/0380766 A1 Dec. 3, 2020

Related U.S. Application Data

(60) Provisional application No. 62/855,872, filed on May 31, 2019.

(51) Int. Cl.
*G06T 15/20* (2011.01)
*G06T 1/20* (2006.01)

(52) U.S. Cl.
CPC .............. *G06T 15/20* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 5,856,829 A | * | 1/1999 | Gray, III | G06T 15/04 345/419 |
| 7,420,557 B1 | * | 9/2008 | Moreton | G06T 15/30 345/427 |
| 8,134,570 B1 | * | 3/2012 | Duluk, Jr. | G06T 15/005 345/581 |
| 8,432,394 B1 | | 4/2013 | Hutchins | |
| 2003/0011595 A1 | * | 1/2003 | Goel | G06T 17/20 345/423 |
| 2003/0063087 A1 | * | 4/2003 | Doyle | G06T 15/405 345/422 |
| 2004/0145589 A1 | * | 7/2004 | Prokopenko | G06T 15/20 345/581 |

(Continued)

OTHER PUBLICATIONS

Heckbert, Paul S., and Henry P. Moreton. "Interpolation for polygon texture mapping and shading." State of the art in Computer graphics: Visualization and Modeling (1991): 101-111. (Year: 1991).*

*Primary Examiner* — Steven Z Elbinger
(74) *Attorney, Agent, or Firm* — Renaissance IP Law Group LLP

(57) ABSTRACT

A graphics pipeline may reduce the number of times when reciprocal, multiply or add computations are used for interpolation computations when though the GPU hardware has been programmed or set to perform a linear-perspective interpolation by determining whether a homogeneous coordinate of each vertex of the primitive is within a predetermined threshold of 1 when a linear-perspective interpolation technique has been specified in a shader program, and determining one or more attributes of the element using a linear interpolation technique based on the homogeneous coordinate of each vertex of the primitive being within a predetermined threshold of 1.

20 Claims, 9 Drawing Sheets

(56) References Cited

U.S. PATENT DOCUMENTS

| | | | |
|---|---|---|---|
| 2005/0231533 A1* | 10/2005 | Chen | G06T 15/20 |
| | | | 345/643 |
| 2008/0198168 A1 | 8/2008 | Jiao et al. | |
| 2015/0325032 A1 | 11/2015 | Jiao et al. | |
| 2017/0039755 A1* | 2/2017 | Heggelund | G06T 15/80 |

* cited by examiner

OPTIMIZED COMPUTATION OF PERSPECTIVE INTERPOLANTS

CROSS-REFERENCE TO RELATED APPLICATION

This application claims the priority benefit under 35 U.S.C. § 119(e) of U.S. Provisional Application No. 62/855,872 filed on May 31, 2019, the disclosure of which is incorporated herein by reference in its entirety.

TECHNICAL FIELD

The subject matter disclosed herein relates to graphics processing units (GPUs). More specifically, the subject matter disclosed herein relates to a system and a method that may reduce the number of times when reciprocal, multiply and/or add computations are used for interpolation computations when the GPU hardware has been programmed to perform a linear-perspective interpolation.

BACKGROUND

Pixel/fragment shader programs typically process multiple input data elements known as "attributes." Frequently, each shader program thread that is executed for a single sample may process sixteen or more different attributes, although fewer attributes may also be processed. The attributes may be processed by interpolation computations. Generally, each element may be independent of the other elements.

For most Application Programming Interfaces (APIs), interpolation of pixel/fragment shader data may use one of three interpolation modes: a flat interpolation mode, a linear interpolation mode, or a linear-perspective interpolation mode. For the flat interpolation mode to be used, all values for all samples for a given primitive are the same. For the linear interpolation mode to be used, all values for all samples for a given primitive are computed as if the values lie on a flat plane. For the linear-perspective interpolation mode to be used, all values for all samples for a given primitive are computed in a planar way and with a perspective correction applied, known as "perspective warping." The most computationally expensive interpolation mode is the linear-perspective interpolation and the computations for the perspective correction are not linear.

In a graphics pipeline, position information within an image may be represented using four coordinates: X (a horizontal position in the image), Y (a vertical position in the image), Z (a depth or distance from the eye in the image), and W (a homogeneous coordinate). The homogeneous coordinate may be used to perform perspective-correct interpolation. Each vertex of a primitive in the image has a position (X, Y, Z, W) as well as zero or more values for other attributes associated with the vertex.

One commonly used API does not provide an application programmer with a linear interpolation mode option. In order to provide a linear interpolation, the programmer selects the linear-perspective mode and sets the value of the W coordinate for all vertices of a primitive to be equal to 1.0. Doing so provides a linear interpolation, but also uses the full computation cost associated with a linear-perspective interpolation. The largest single cost of a full linear-perspective interpolation may be the interpolation of 1/W, the subsequent computation of W from 1/W using a reciprocal process followed by multiplication of W and the linear interpolation result.

A typical GPU may have a limited area provided for interpolation and particularly for reciprocal computations. As a result, reciprocal, multiply or divide computations for interpolation may present a performance bottleneck.

SUMMARY

An example embodiment provides a method to interpolate one or more attributes of an element of a primitive being rendered in a graphics pipeline in which the method may include: determining that a homogeneous coordinate of the element is within a predetermined threshold of 1 based on a linear-perspective interpolation technique having been specified for rendering the primitive; interpolating the attributes of the element using a linear interpolation technique based on the homogeneous coordinate of the element being within a predetermined threshold of 1; and interpolating the attributes of the element using a linear-perspective interpolation technique based on the homogeneous coordinate of the element being outside of the predetermined threshold of 1. In one embodiment, determining whether the homogeneous coordinate of the primitive is within the predetermined threshold of 1 further may include determining whether the homogeneous coordinate of each vertex of the primitive is equal to 1. In another embodiment, the attributes of an element may be further associated with a vertex of the primitive. In still another embodiment, the primitive may be a triangle or a line.

An example embodiment provides a graphics pipeline stage that may include an input, a comparator, and an interpolator. The input may receive one or more attributes of a primitive. The comparator may compare a value of a homogeneous coordinate of the attributes of the primitive to 1 to determine whether the value of the homogeneous coordinate is within a predetermined threshold of 1 based on a linear-perspective interpolation technique having been specified for rendering the primitive. The interpolator may interpolate the attributes of the primitive using a linear-interpolation technique based on the value of the homogeneous coordinate being determined to be within the predetermined threshold of 1, and may interpolate the attributes of the primitive using the linear-perspective interpolation technique based on the value of the homogeneous coordinate being determined to be outside of the predetermined threshold of 1. In one embodiment, the comparator may further determine whether the value of a homogeneous coordinate of a primitive is a constant that is not equal to 1 based on a linear-perspective interpolation technique having been specified for rendering the primitive, and the interpolator may further interpolate the attributes of the primitive using the linear-interpolation technique based on the value of the homogeneous coordinate being determined to be a constant that is not equal to 1, and interpolate the attributes of the primitive using the linear-perspective interpolation technique based on the value of the homogeneous coordinate being other than a constant that is not equal to 1. In another embodiment, the comparator may further determine whether coefficients of a plane equation for attributes of the primitive are constant, and the interpolator may further interpolate the attributes of the primitive based on the coefficients of the plane equation being determined to not be constant, and may omit interpolating the attributes of the primitive based on the coefficients of the plane equation being determined to be constant.

An example embodiment provides a graphics processing unit that may include a graphics processing stage and a shader unit. The graphics processing stage may include an input, a comparator, and an interpolator. The input may receive one or more attributes of a primitive. The comparator may determine whether a value of a homogeneous coordinate of a primitive is a constant that is not equal to 1 based on a linear-perspective interpolation technique having been specified for rendering the primitive. The interpolator may interpolate the attributes of the primitive using a linear-interpolation technique based on the value of the homogeneous coordinate being determined to be a constant that is not equal to 1, and may interpolate the attributes of the primitive using the linear-perspective interpolation technique based on the value of the homogeneous coordinate being other than a constant that is not equal to 1. The shader may receive an output of the interpolator and may render the primitive. In one embodiment, the comparator may further compare the value of the homogeneous coordinate of the attributes of the primitive to 1 to determine whether the value of the homogeneous coordinate is within a predetermined threshold of 1 based on a linear-perspective interpolation technique having been specified for rendering the primitive, and the interpolator may further interpolate the attributes of the primitive using the linear-interpolation technique based on the value of the homogeneous coordinate being determined to be within the predetermined threshold of 1, and may interpolate the attributes of the primitive using the linear-perspective interpolation technique based on the value of the homogeneous coordinate being determined to be outside of the predetermined threshold of 1. In another embodiment, the comparator may further determine whether coefficients of a plane equation for attributes of the primitive are constant, and the interpolator may further interpolate the attributes of the primitive based on the coefficients of the plane equation being determined to not be constant, and may omit interpolating the attributes of the primitive based on the coefficients of the plane equation being determined to be constant.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1B:
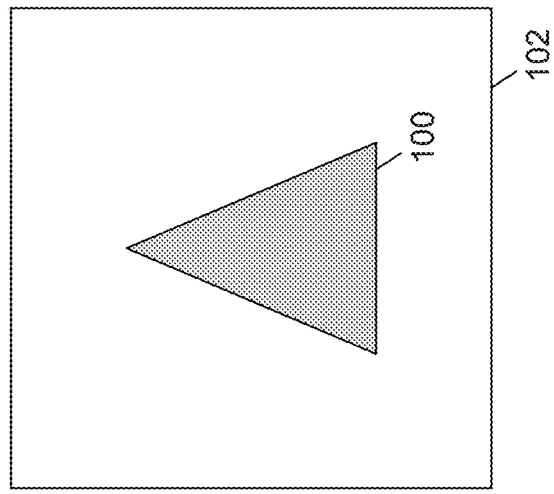
FIG. 1B depicts the example object of FIG. 1A as projected onto a 2D screen.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

The subject matter disclosed herein provides a flat W optimization that may reduce the number of times when reciprocal, multiply and/or add computations are used for interpolation computations when GPU hardware may have been programmed to perform a linear-perspective interpolation. A condition may be detected in which linear interpolation may be used when a linear-perspective interpolation has been specified through the API and the computations may be modified so that linear computations are used. One way to determine whether the optimization disclosed herein may be used is to determine whether the W values of the vertices of a primitive all equal to 1.0. Another way to determine whether the optimization disclosed herein may be used is to determine whether the W plane-equation coefficients or barycentric factors computed from the vertices of a primitive correspond to W equal to 1.0. Application of the optimization disclosed herein may save area within a GPU and/or may improve performance of a graphics pipeline. Energy may also be saved, and PPA (Power, Performance, and Area) may be further optimized.

The subject matter disclosed herein may be implemented in one of several locations in a graphics pipeline. In one example embodiment, the optimization may be implemented at a final interpolation stage that actually performs the majority of interpolation computations.

Figure 1A:
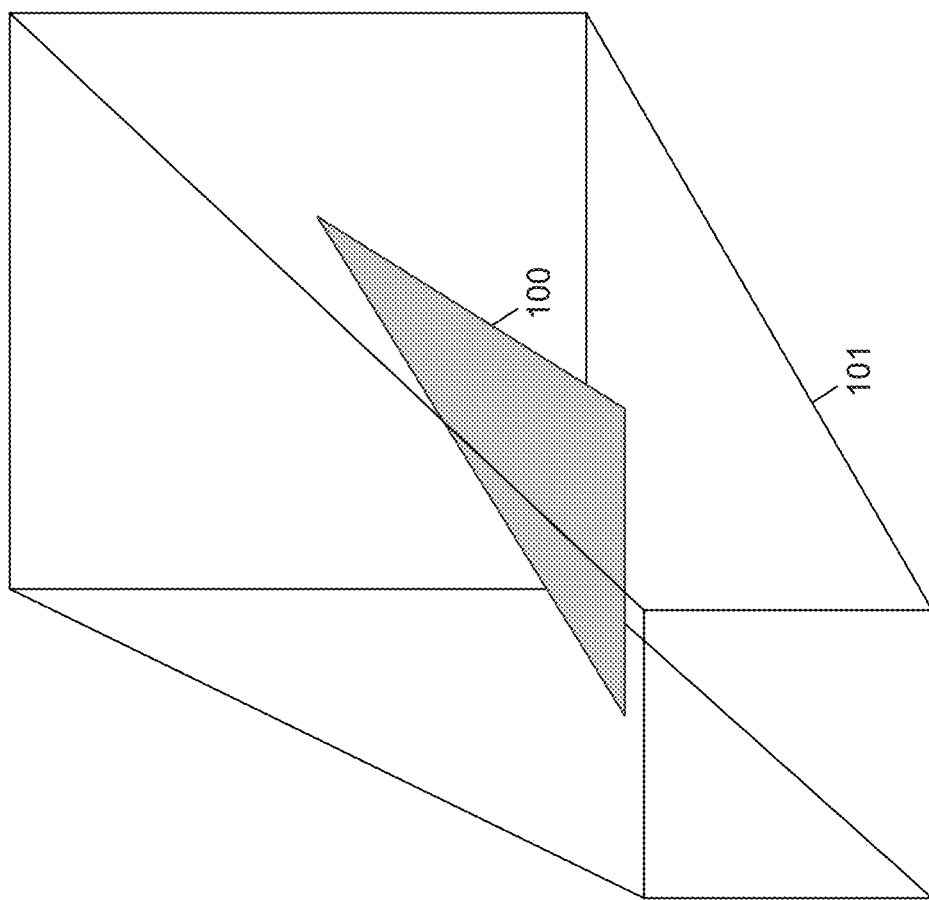
FIG. 1A depicts an example object in 3D space that may be viewed from the eye of a person.

Two algorithms are primarily used to interpolate data: a plane-equation interpolation algorithm and barycentric interpolation algorithm. The two algorithms generally include similar computations and generate the same results. The following discussion focuses on plane-equation interpolation; however, the same principles apply to barycentric interpolation. Consider an example object 100 in three-dimensional (3D) space that is viewed from the eye of a person. Such a view is known as the view frustum 101, as depicted in FIG. 1A. If, for example, the object 100 is tilted away from a viewer (or toward the viewer) in 3D space, the shape of the object 100 from the eye view point is changed as are image data at locations of the object. When the object 100 is projected onto a two-dimensional (2D) screen 102, such as depicted in FIG. 1B, the data representing the object 100 must be computed in a manner that takes into account the 3D tilting, which is called perspective warping. The data should be computed in a perspectively corrected manner.

Figure 2B:
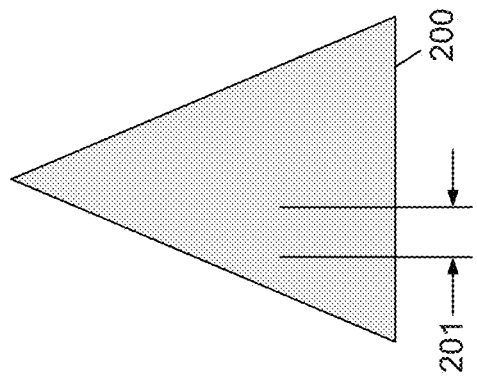
FIG. 2B depicts the example of FIG. 2A as projected onto a 2D screen (not shown)
Figure 2A:
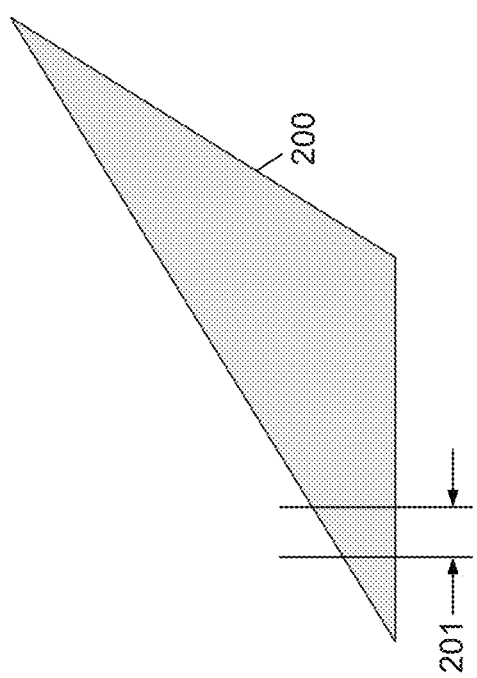
FIG. 2A depicts a perspective view of an example planar object that is tilted away from a viewer within a view frustum (not shown) for the viewer.

FIG. 2A depicts a perspective view of a planar object 200 that is tilted away from a viewer within a view frustum (not shown) for the viewer. Data at, for example, surface 201, for the planar object 200 may be linearly (planar) interpolated across its surface if the object 200 is perpendicular to the eye point of the viewer, as depicted in FIG. 2B.

According to the subject matter disclosed herein, linear interpolation may be used for interpolation computations for both linear and linear-perspective interpolation. Linear interpolation will be described first, followed by modifications to a linear interpolation that may be done to perform a linear-perspective interpolation.

Equation (1) sets forth a plane equation that may be used for linear interpolation. The value of an Attribute$_j$ may be computed from the three plane-equation coefficients in Eq. (1).

$$\text{Attribute}_j[x,y] = A_j \cdot x + B_j \cdot y + C_j, \quad (1)$$

in which the coefficient A is the gradient for the attribute j in the x dimension. The coefficient B is the gradient for the attribute j in the y dimension, and the coefficient C is the value of the attribute j at (x, y)=(0, 0).

Equation (1) may be modified to ensure that correct results are provided if the value of the coefficient C at (0, 0) is not a good number, such as infinity or an IEEE floating point "Not a Number (NaN)", or is outside of the dynamic range of the interpolation hardware. A seed location is typically selected to be inside a primitive, such as one of the vertices. Equation (1) may be modified as shown in Eq. (2). For modified Eq. (2), the coefficient C is the value of the attribute at the seed location.

$$\text{Attribute}_j[x,y]=A_j*(x-\text{seed}\cdot x)+B_j*(y-\text{seed}\cdot y)+C_j, \quad (2)$$

in which seed·x is the x coordinate of the seed location, and seed·y is the y coordinate of the seed location.

The coefficients may be computed from primitive vertex positions and interpolated attribute values. For example, for a triangle (the most basic primitive rendered in most GPUs) three vertices are used. The computation of the plane-equation coefficients ($A_j$, $B_j$, $C_j$) (and the barycentric equivalents) are well known and are not detailed here.

A linear-perspective interpolation algorithm may change the linear interpolation of Eqs. (1) and (2) by modifying the attribute values that are used to compute the plane-equation coefficients ($A_j$,$B_j$,$C_j$) and applying a correction after the plane equations have been evaluated. For example, the following process, or steps, may be used for modifying the linear interpolation Eqs. (1) and (2).

First, the vertex attribute values may be modified before computation of the plane-equation coefficients by dividing the vertex attribute values by the W coordinate at each vertex, which is referred to as a pre-interpolation correction computation. As a second step, 1/W [X, Y] may be linearly interpolated (1/W [X, Y] is planar), and a reciprocal computation may be performed at each interpolation location [X, Y]. As a third step, the result of interpolation at each sample point may be modified by a post-interpolation-correction computation by multiplying by W at the sample point.

The reciprocal of W (i.e., 1/W) may be computed at each vertex during the second step. The attribute values at the vertices that are to be interpolated with a perspective correction may be multiplied by 1/W resulting in Attribute$_j$/W values at the vertices and plane equations are computed from these values rather than the original vertex Attribute$_j$ values. Thus, Attribute$_j$/W may be actually interpolated using linear interpolation. W may not be planar and is actually computed by linearly interpolating 1/W, as described above, which is planar. W may be typically computed from the depth values at the vertices (Z values).

Rasterization generates sample locations in an image that is being rendered (i.e., generated). The sample locations are inside the boundaries of a primitive based on the positions of primitive vertices. During rasterization of the primitive, many more sample positions may be generated than the number of vertices of the primitive. Additionally, attributes corresponding to each sample position are interpolated. For example, a primitive that may be defined as a triangle having three vertices may cover 10, 50, 1000 or more sample locations (typically called pixels) generated from the primitive.

The first step of modifying a linear interpolation to perform linear-perspective interpolations (i.e., modifying Eqs. (1) and (2)) described above may be optionally optimized although the benefit may be only about 5% of the benefit provided by optimizing at the second step of modifying a linear interpolation. The difference in benefits may be based on an expansion resulting from rasterization that occurs in connection with the second step. Thus, the cost/benefit of optimizing the first step of modifying a linear interpolation may be limited and application of the optimization during the first step may not affect the application of the optimization during the second step. An additional reason that optimization of the first step may be considered to be optional is that if the first step pre-multiplies attributes by 1/W before computing plane equation coefficients and if W=1.0, then W 1/W=1.0. Pre-multiplying attributes by 1.0 does not change the plane-equation coefficients. Nevertheless, the first step may be optimized, in which case the optimization may be performed once for each vertex of each primitive. Optimization of the second step of modification may provide the greatest benefits. Optimization at the second step of modification may be performed repeatedly for each primitive.

Detection of a condition that allows optimization and implementation of the optimization according to the subject matter disclosed herein may be performed at different locations in a graphics pipeline, and may be implemented in hardware, software or a combination of hardware and software. For example, detection and implementation may be performed at a relatively early stage in a graphics pipeline, such as at a clip, cull and viewport (CCV) stage or unit, or at a primitive setup (SU) stage or unit. Condition detection and implementation may also be performed at an interpolation pipeline stage or unit where final interpolation and post-correction computations are performed. The majority of any potential benefit of utilizing the optimization disclosed herein may be in the interpolation pipeline stage.

If a condition for optimization is detected before the setup computations (i.e., relatively early in a graphics pipeline) that compute the plane-equation coefficients (or barycentric factors), then the W values of the vertices may be tested to determine whether the W values of the vertices of a primitive are exactly 1.0. Alternatively, the W values of the vertices of a primitive may be determined to be within a predetermined threshold of 1.0, such as 1.0±0.001. If the W values of all vertices of a primitive equal 1.0 (or are within a predetermined threshold of 1.0), then linear-perspective interpolation computations are not required and the optimization disclosed herein may be applied.

If a condition for optimization is detected after the plane-equation coefficients have been computed (i.e., relatively later in the graphic pipeline), then the plane-equation coefficients (or barycentric factors) may be tested to determine whether the W value for the attribute is exactly 1.0. That is, the coefficients A and B plane-equation are determined to be 0.0 (or within a predetermined threshold) and the coefficient C coefficient may be tested to determine whether it is exactly 1.0 (or within a predetermined threshold). In one embodiment, the predetermined threshold for the coefficients A and B may ±0.001, and the predetermined threshold for the coefficient C may ±0.001.

Multiple stages in a graphic pipeline architecture may benefit from the optimization disclosed herein. For example, a CCV unit may benefit from a reduced linear-perspective interpolation computational work with a corresponding reduction in power. An SU unit may benefit from a reduced computational work and a corresponding power reduction. An IPA unit can reduce computation work (power reduction, performance improvement).

Figure 3:
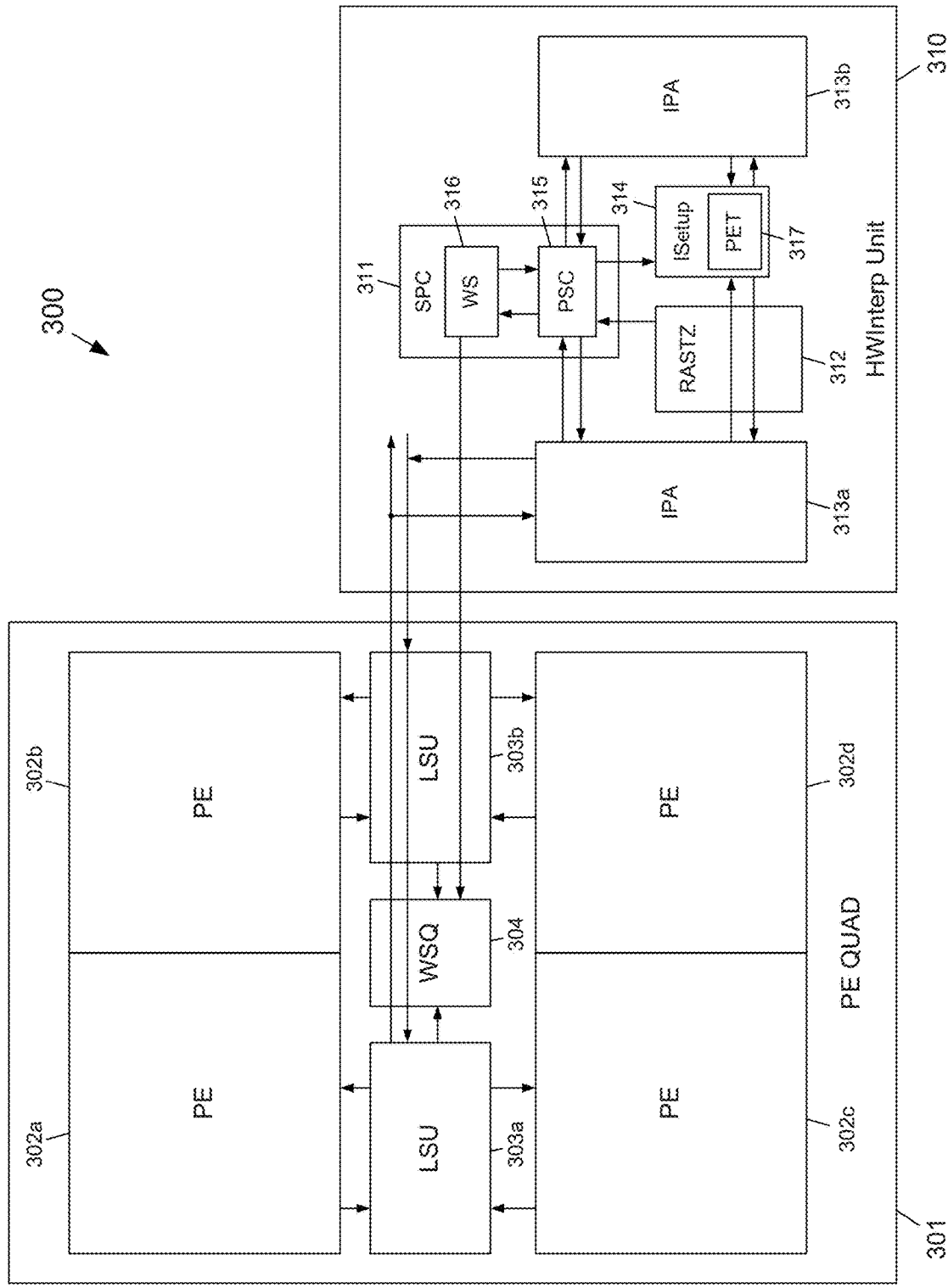
FIG. 3 depicts a block diagram of an interpolation pipeline portion of an example GPU that may incorporate a flat W optimization according to the subject matter disclosed herein.

FIG. 3 depicts a block diagram of an interpolation pipeline portion of an example graphics processing unit (GPU) 300 that may incorporate a flat W optimization according to the subject matter disclosed herein. The portion of the example embodiment of GPU 300 depicted in FIG. 3 may include a processing element (PE) quad 301, and a hardware interpolator (HWInterp) unit 310. The PE quad 301 may include one or more PEs 302, one or more load-store units (LSUs) 303, and one or more WARP sequencers (WSQs) 304. The interpolation pipeline 310 may include a shader processing controller (SPC) 311, one or more raster and Z units (RASTZs) 312, one or more interpolation units (IPAs) 313a-313b, and one or more interpolation setup (ISetup) units 314. The shader processing controller 311 may include one or more pixel shader constructor (PSCs) 315, and one or more WARP scheduler (WSs) 316. It should be understood that the various components forming the portion of the interpolation pipeline depicted in FIG. 3 may be modules that may be any combination of software, firmware and/or hardware configured to provide the functionality described herein in connection with the component or module.

Figure 4:
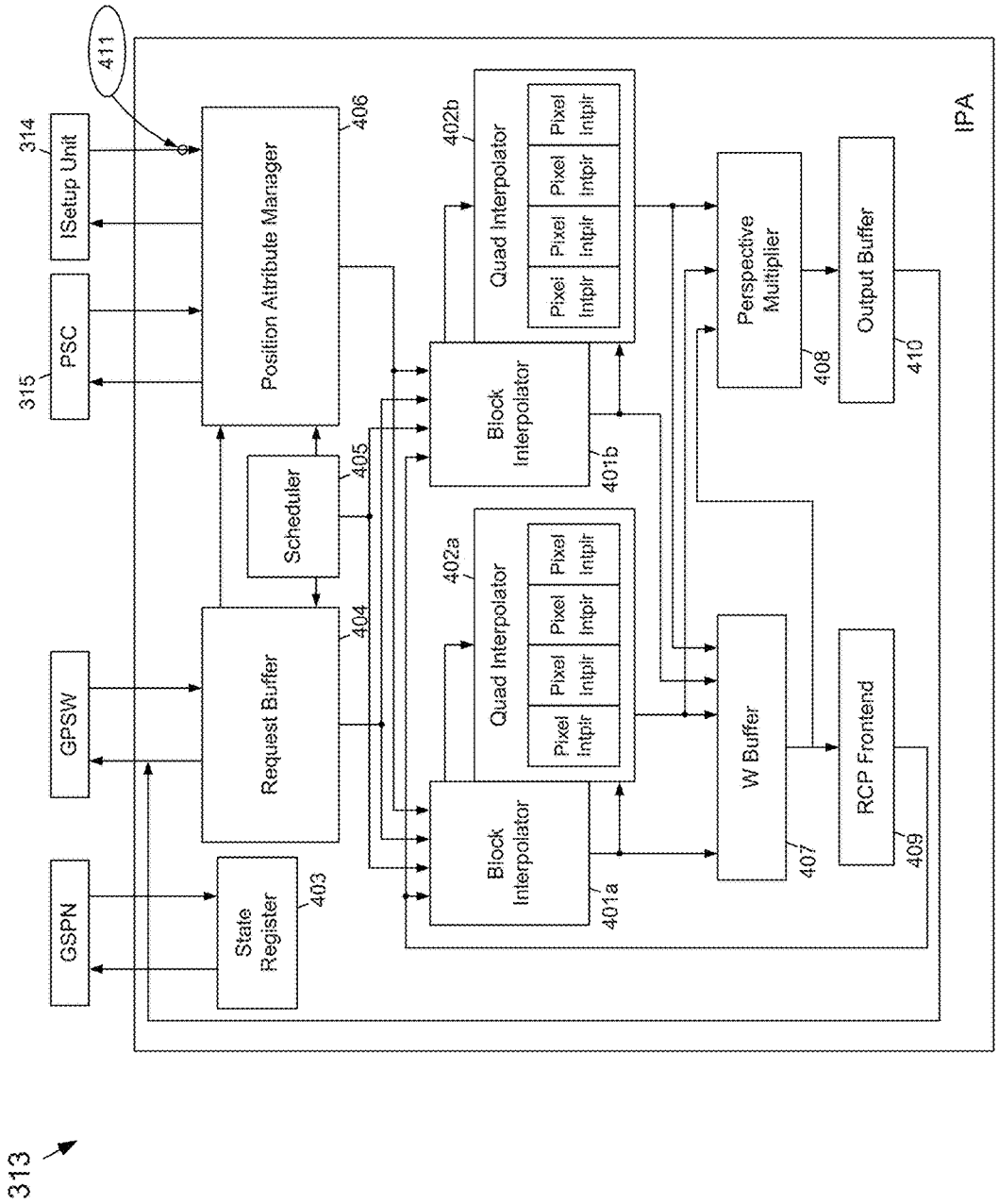
FIG. 4 depicts a block diagram of an example embodiment of an interpolation unit that may be configured to incorporate a flat W optimization according to the subject matter disclosed herein

Generally, control flow for an interpolation operation may be as follows. In one embodiment, the RASTZ 312 sends quads of pixels to the PSC 315 of the SPC 311 with information, such as X, Y coordinates, pixel or sample masks, primitive IDs, primitive and draw end information. In one example, the PSC 315 constructs a pixel shader (PS) warp that may, for example, contain eight quads, and makes a request to the WS 316. The WS 316 may allocate a Warp ID and supply other control information for the PS warp and passes the allocation back to the PSC 315. The WS 316 may also notify the WSQ 304 in the PE Quad 301 to prepare the warp for execution. The PSC 315 may pass the warp ID, the X, Y coordinates, masks and primitive information for the pixel quad to, for example, either IPA 313a, or IPAs 313b. The IPA 313a (or IPA 313b) begins interpolation based on, for example, an attribute mask and the interpolation modes in a state register 403 (FIG. 4). The IPA 313a performs the interpolation.

In one embodiment, the IPA 313a may send the interpolation results to a vector register file (RF) in a Processing Element (PE) of the PE Quad 301 through a Load Storage Unit (LSU) 303. The LSU 303 notifies the WSQ 304 after writing the last attribute data for the warp to the vector RF so that the WSQ 304 may update the status of the warp, and makes the warp ready for shader execution. In one embodiment, the IPA 313 passes a primitive done signal to the PSC 315 when the IPA 313 completes interpolation for a primitive. When the PSC 315 receives the primitive done signals for the primitive from either or both IPAs 313a and 313b, the PSC 315 returns a final primitive done signal to the SU 314. The ISetup unit 314 may also include a plane equation table (PET) 317 that supplies attribute plane equations and triangle seed positions to a shared block interpolator and reciprocal unit (SBR) within an IPA. The plane equations may be generated by the ISetup unit 314 and stored in the PET 317. The plane equations may be released after all interpolation associated with a primitive is completed.

FIG. 4 depicts a block diagram of an example embodiment of an IPA 313 that may be configured to incorporate a flat W optimization according to the subject matter disclosed herein. In one embodiment, the IPA 313 may include interfaces for the PSC 315, the ISetup unit 314, a GPSN, and a GPSW, which are respectively interconnect buses for control data and requests for interpolation by, for example, a shader program. In one embodiment, the IPA 313 may include one or more block interpolators 401a-401b, one or more quad pixel interpolators 402a-402b, the state register 403, a request buffer 404, a scheduler 405, a position attribute manager 406, a W buffer 407, a perspective correction multiplier (PCM) 408, a shared block and reciprocal unit (RCP frontend) 409, and an output buffer 410. Other numbers of modules forming the IPA 303 are possible. It should be understood that the various components forming the example embodiment of the IPA 300 depicted in FIG. 4 may be modules that may be any combination of software, firmware and/or hardware configured to provide the functionality described herein in connection with the component or module.

In one embodiment, the request buffer 404 may store the requests from a PE 402, which may contain information relation to an interpolation precision, a perspective division enable flag, an interpolation location, a start attribute slot number and component mask, a valid lane mask, a programmable pixel offset and sample index and request synchronization flags for each pixel of the shader warp. The interpolation may be split into two steps: an 8×8 block interpolation and a pixel interpolation. For pixels within the same 8×8 block, the block results may be re-used, allowing a block interpolator 401 to be used for reciprocal calculations. A block interpolator 401 may receive attribute plane equations, triangle seed positions and the X, Y coordinates of the 8×8 block within which the input pixel quads are located and may perform the block interpolation. The result of the block interpolation may be forwarded to the quad pixel interpolator 402, and used as a base for the quad pixel interpolation. The block interpolator 401 may also perform the reciprocal calculation of the W value used in a perspective correction.

In one embodiment, the IPA 313 may handle varying attribute interpolation at every pixel or sub-sample, as well as a merger of a pixel screen coordinates of the pixel shader inputs. The varying attribute interpolation may be performed in two stages, the first stage may be a block level base interpolation at the center of an 8×8 pixel block using one or more of the block interpolators 401, and the second stage may be a pixel level interpolation within the 8×8 pixel block using one or more of the one or more quad pixel interpolators 402. As soon as the IPA 313 receives the XY screen coordinates of, for example, a 2×2 pixel quad, and there is space available in the output buffer 410, the IPA 313 may begin processing the pixel block.

If a primitive covers more than one 2×2 quad in the 8×8 pixel block, the IPA 303 may perform optimizations to reuse the existing 8×8 interpolation result without recalculating the result, as well as avoiding any unnecessary plane equation reads, which may reduce resource consumption (e.g., processing power, physical hardware area, etc.). The PAM 406 may receive the pixel quad information for the PSC 305 and may pack the quad positions, pixel and sample masks, and primitive IDs into warp data structures. The PAM 406 may further request attribute plane equations and triangle seed positions from the PET 315 in the ISetup unit 314, and passes the information to a block interpolator unit 401 to perform the interpolation.

The quad pixel interpolator 402 may perform a quad pixel interpolation based on attribute plane equations, the 8×8 block interpolation results and the X, Y offsets of the pixels within the 8×8 block. In one example, the W buffer 407 may store the interpolated W values from quad pixel interpolator, as well as the W reciprocals from the block interpolator 401, and may send the interpolated W values to the block interpolator 401 for reciprocal calculation and W reciprocals to the PCM 408 for the final multiplication.

The scheduler 405 may schedule interpolation requests on a per warp basis, and also may sequence the requests of the block interpolator 401 and the quad pixel interpolator 402 for block, pixel interpolation and W reciprocal calculation. The PCM 408 may perform multiplication of W reciprocals with every interpolated attribute value at a selected interpolation location. The output buffer 410 may collect the final outputs of the interpolation results after a perspective correction. The output buffer 410 may compensate for latency of the interpolation pipeline and may help smooth out the output traffic to the interconnect buses.

Figure 5:
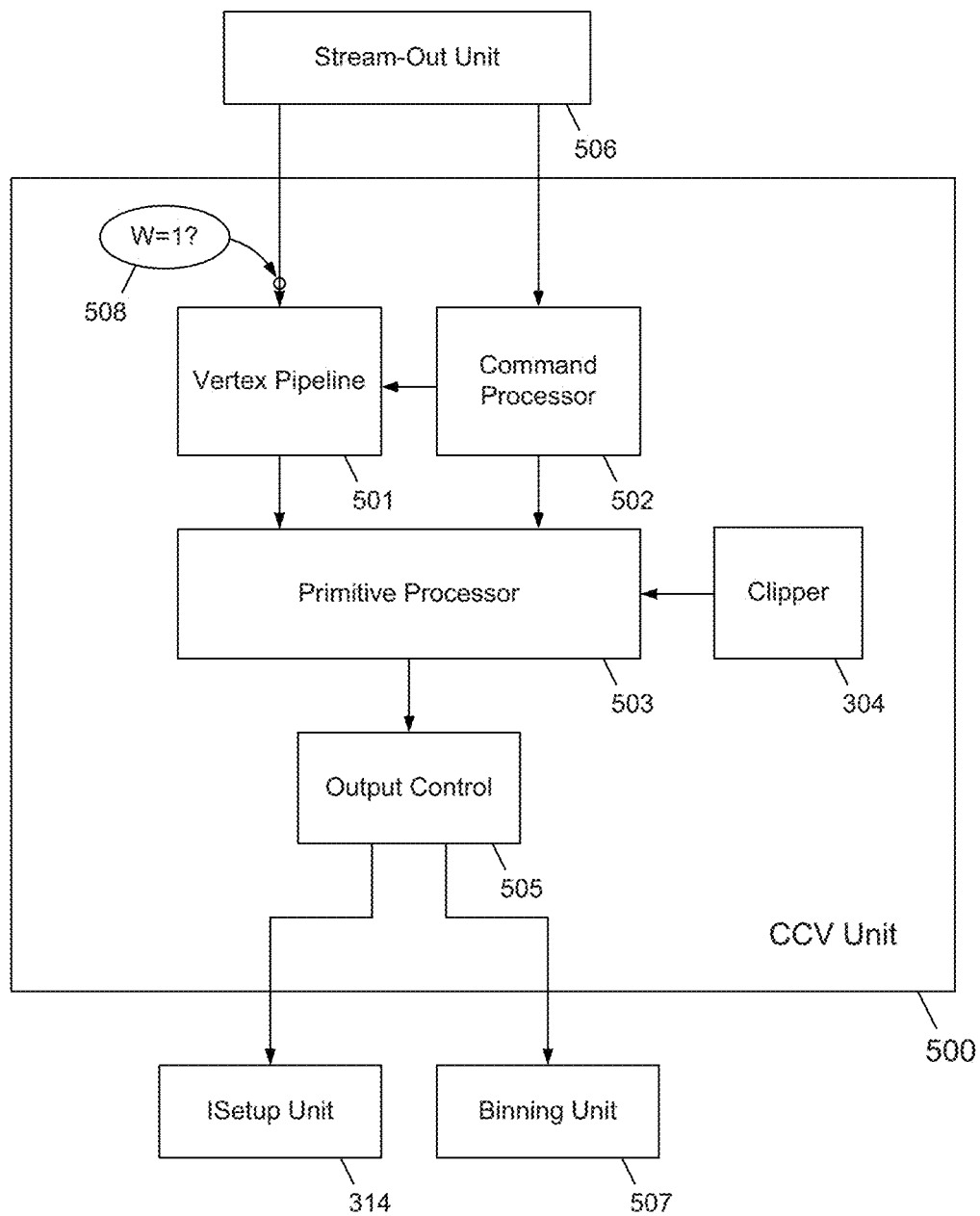
FIG. 5 depicts a block diagram showing an example location at an input to a clip-cull-viewport unit where detecting whether the homogeneous coefficient W equals or nearly equals 1.0 may be efficient according to the subject matter disclosed herein.
Figure 6:
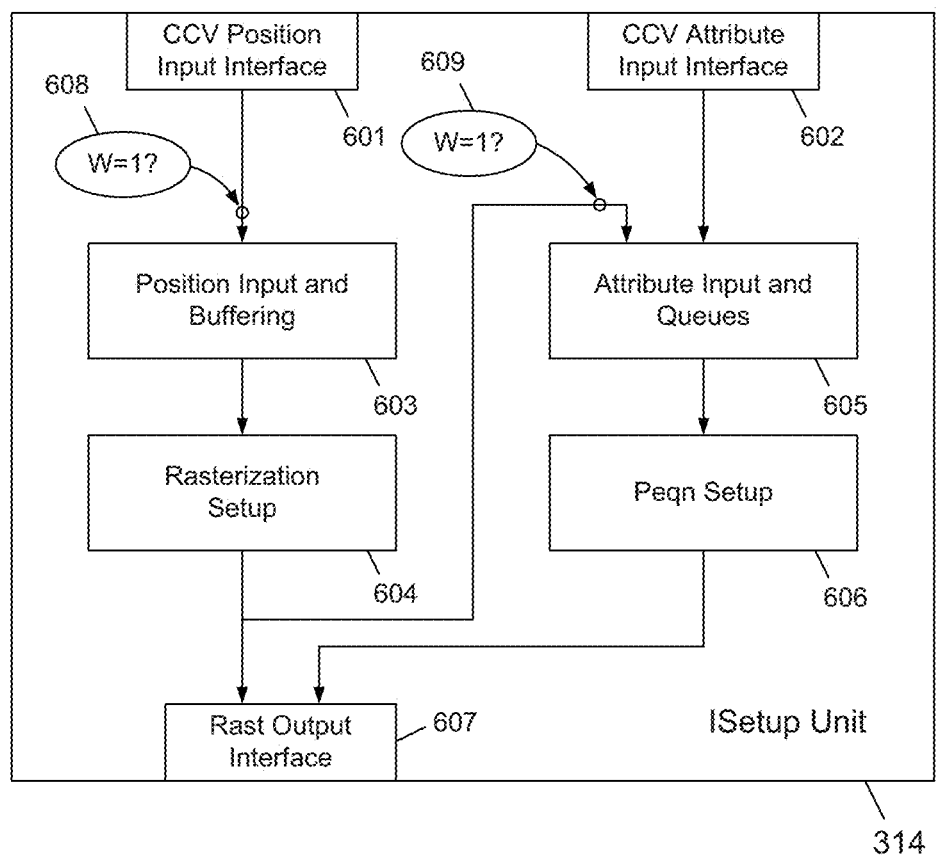
FIG. 6 depicts a block diagram showing example locations within a setup unit where detecting whether the homogeneous coefficient W equals or nearly equals 1.0 may be efficient according to the subject matter disclosed herein

FIGS. 4-6 depict example locations in the example graphics pipelines disclosed herein where detecting whether the homogeneous coefficient W equals or nearly equals 1.0 may be efficient according to the subject matter disclosed herein. Determination of whether W equals or nearly equals 1.0 may be conceptually thought of as testing individual vertices or as testing the vertices of individual primitives. Determination of whether W equals or nearly equals 1.0 may be performed in hardware by, for example, one or more comparators, in software, in firmware or a combination of hardware, software and/or firmware. Additionally, the results of a determination whether W equals or nearly equals 1.0 may be passed down the graphics pipeline for used at a later stage.

When testing individual vertices for W equaling or nearly equaling 1.0, efficient locations in the graphics pipeline may be at an input to a clip-cull-viewport (CCV) unit and/or at an input to an ISetup unit 314. When testing vertices of individual primitives, an efficient location in the graphics pipeline may be at an input of an attribute position manager in an IPA unit in the graphics pipeline. Alternatively, detection for the condition for applying the optimization disclosed herein may be implemented using both testing individual vertices and testing vertices of individual primitives. Computational savings provided by the optimization disclosed herein may increase from a CCV unit to an ISetup unit and again at an IPA.

Determination of whether W equals or nearly equals 1.0 on a primitive-by-primitive basis may be located at an input to the position attribute manager module 406 (indicated at 411) of the example IPA unit 313 depicted in FIG. 4. Additionally, it may be determined whether the X and Y gradients equal or are nearly equal to 0 while offset C equal or nearly equal 1. A determination of whether W equal or nearly equals 1.0 within the IPA unit 313 may allow operations to be skipped on a per-pixel or per-sample basis for linearly interpolating $1/W(x,y)$ at each pixel or sample location and computing W as $W(x, y)=1/(1/W(x,y))$. Additionally, an output attribute correction may also be skipped (i.e., Interpolated. Attribute $[x,y]*W(x,y)$). The determination and skipping of operations may be applied to all tile rendering passes.

FIG. 5 depicts a block diagram showing an example location at an input to a CCV unit 500 where detecting whether the homogeneous coefficient W equals or nearly equals 1.0 may be efficient according to the subject matter disclosed herein. The CCV unit 500 may include a vertex pipeline module 501, a command processor module 502, a primitive processor module 503, a clipper module 504, and an output control module 505. The respective modules components forming the CCV unit 500 may be implemented as any combination of software, firmware and/or hardware configured to provide the functionality described herein in connection with the CCV unit 500. It should be understood that the CCV unit 500 may include additional components, modules, and/or functional blocks that are not shown in FIG. 5.

The vertex pipeline 501 may receive input data and the command processor 502 may receive commands from a stream-out (SO) unit 506. An output of the vertex pipeline 501 may be input to the primitive processor 503. The command processor 502 may control the vertex pipeline 501 and the primitive processor 503 based on commands received from the SO unit 506. The primitive processor 503 may also be controlled by the clipper 504. An output of the primitive processor 503 may be input to the output control 505. The output control 505 may output processed primitives to an ISetup unit 314 and a binning (BIN) unit 507.

Determination of whether W equals or nearly equals 1.0 for individual vertices may be located at an input to the CCV unit 500. More specifically, a determination of whether W equals or nearly equals 1.0 may be located at the input to the vertex pipeline, as indicated at 508. Determination of whether W equals or nearly equals 1.0 at 508 may be performed in hardware by, for example, one or more comparators, in software, in firmware or a combination of hardware, software and/or firmware.

The determination of whether W equal or nearly equals 1.0 at the input of the CCV unit 500 may allow operations to be skipped for computing attributes for each vertex in which W equals or nearly equals 1.0. Additionally, operations may be skipped that involve normalized device coordinates (NDC) position computations, such as $Xclip*1/W$, $Yclip*1/W$, and $Zclip*1/W$. The determination and skipping of operations may be applied to all processing passes, including binning and all tile rendering passes.

FIG. 6 depicts a block diagram showing example locations within an ISetup unit 314 where detecting whether the homogeneous coefficient W equals or nearly equals 1.0 may be efficient according to the subject matter disclosed herein. The ISetup unit 314 may include a CCV position input interface 601 module, a CCV attribute input interface 602 module, a position input and buffering module 603, a rasterization setup module 604, an attribute input and queues module 605, a plane-equation (Peqn) setup module 606, a raster (rast) output interface module 607, and a plane equation table 317 (FIG. 3). The respective modules components forming the ISetup unit 314 may be implemented as any combination of software, firmware and/or hardware configured to provide the functionality described herein in connection with the ISetup unit 314. It should be understood that the SU unit 314 may include additional components, modules, and/or functional blocks that are not shown in FIG. 6.

Determination of whether W equals or nearly equals 1.0 for individual vertices may be located at an input to the position input and buffering module 603 (indicated at 608) and/or at the input to the attribute input and queues module 605 (indicated at 609). Determination of whether W equals or nearly equals 1.0 at 608 and/or at 609 may be performed in hardware by, for example, one or more comparators, in software, in firmware or a combination of hardware, software and/or firmware. A determination of whether W equal or nearly equals 1.0 within the ISetup unit 314 may allow operations to be skipped for computing attributes for each vertex in which W equals or nearly equals 1.0. In particular, the operations that may be allowed to be skipped may include perspective pre-multiplying a vertex attribute by $1/W$, i.e., Vertex. Attribute $[Vertex.N]*1/w$ at 605 for non-clipped primitives or for primitives that were clipped at 606. No plane equation has to be created and stored in a plane equation table 317 for the $1/W$. The determination and skipping of operations may be applied to all tile rendering passes.

Figure 7:
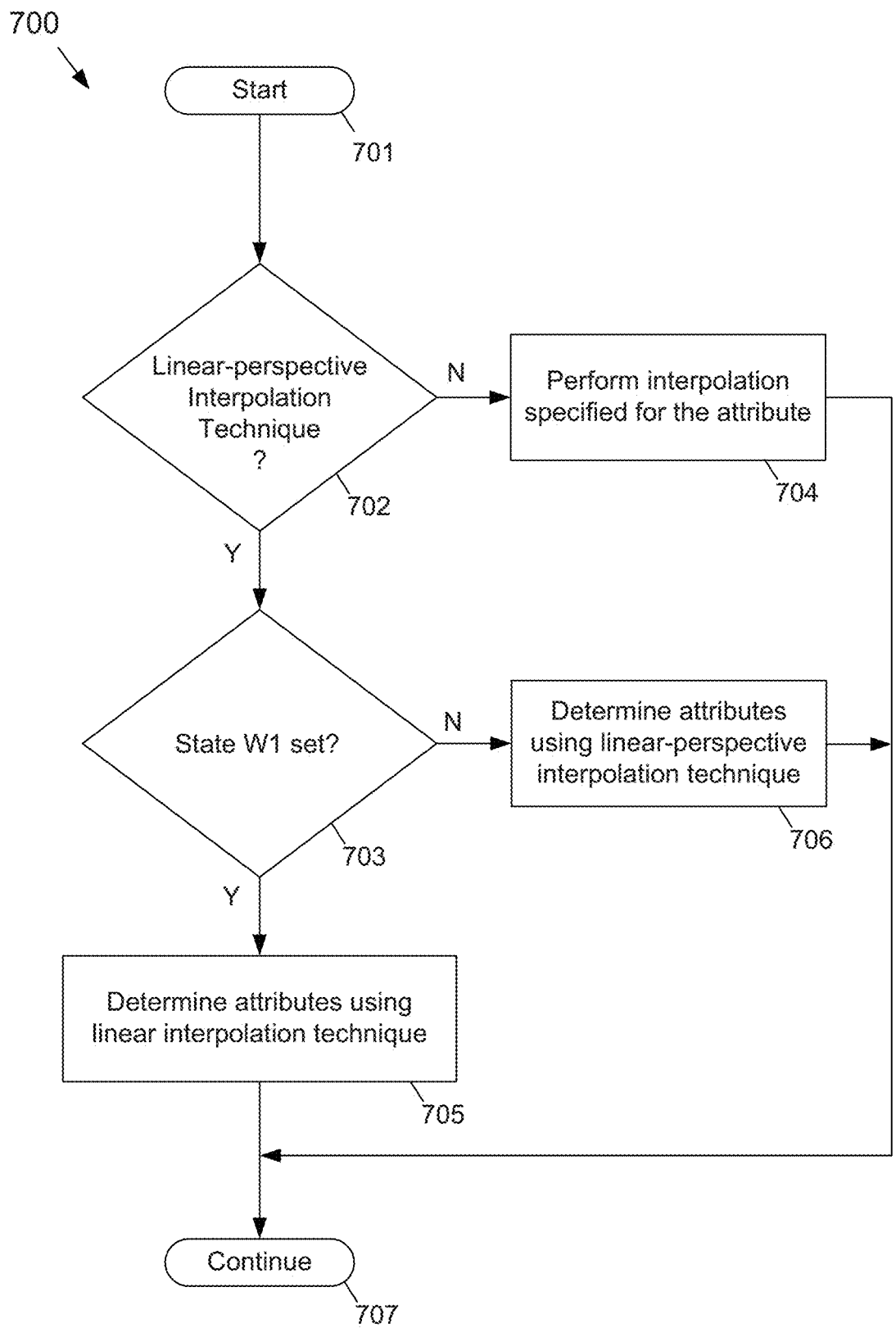
FIG. 7 depicts a flowchart of a method to interpolate one or more attributes of an element associated with a primitive being rendered in a graphics pipeline if a linear-perspective interpolation technique has been specified in, for example, a shader program according to the subject matter disclosed herein.

FIG. 7 depicts a flowchart of a method 700 to interpolate one or more attributes of an element associated with a primitive being rendered in a graphics pipeline if a linear-perspective interpolation technique has been specified in, for example, a shader program according to the subject matter disclosed herein. It should be understood that a linear-perspective interpolation technique may be specified for interpolating attributes of an element associated with a primitive being rendered in a manner other than by a shader program. The process starts at 701, possibly arriving from 810 in FIG. 8. At 702, it is determined whether a linear-perspective interpolation technique has been specified for interpolating the attributes of the element of the primitive. If so, flow continues to 703, otherwise flow continues to 704 where interpolation is performed as specified for the attribute. Flow continues to 707 where the method 700 ends.

At 703, it is determined whether the primitive state W=1 is set. If so, flow continues to 705 where one or more attributes for the element associated with the primitive may be determined using a linear interpolation technique. Flow continues to 707 where, for example, a shader program continues to execute. If, at 703, the primitive state W=1 is not set, flow continues to 706 where one or more attributes for the element associated with the primitive may be determined using a linear-perspective interpolation technique. Flow continues to 707 where the shader program continues to execute.

Figure 8:
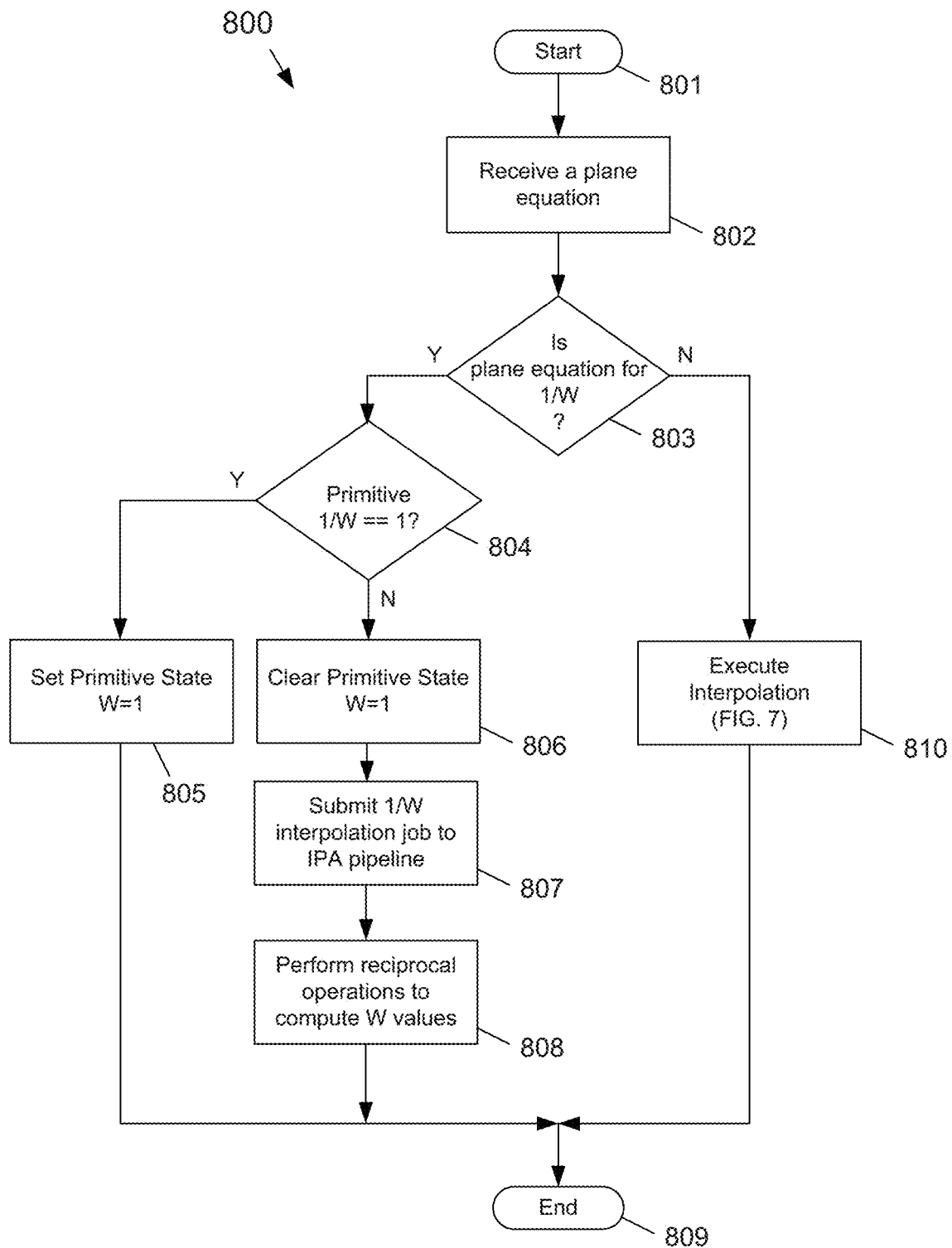
FIG. 8 depicts a flow diagram of an example embodiment of optimization after a determination process whether a homogeneous coefficient W equals or nearly equals 1.0 that may be used according to the subject matter disclosed herein.

FIG. 8 depicts a flow diagram 800 of an example embodiment of optimization after a determination process whether a homogeneous coefficient W equals or nearly equals 1.0 that may be used according to the subject matter disclosed herein. The process begins at 801. At 802, a plane equation is received from the SU 314. Either 1/W for a primitive or plane equations for the attributes of a primitive may be received. The computation datapath through the IPA 313 is shared for 1/W interpolations and regular attribute interpolations. At 803, it is determined whether the plane equation is for 1/W. If so, flow continues to 804 where it is determined whether the primitive state 1/W=1 (or nearly equals 1)? If so, flow continues to 805 where the primitive state for W=1 is set. Flow continues to 809 where the interpolation for 1/W is complete.

If, at 804, it is determined that the primitive state 1/W does not equal 1 (or does not nearly equals 1), flow continues to 806 where the primitive state 1/W is cleared. Flow continues to 807 where 1/W is submitted to the IPA pipeline. At 808, reciprocal operations are performed to compute W values. Flow continues to 809 where interpolation of 1/W is complete.

If, at 803, it is determined that the plane equation is not for 1/W, flow continues to 810 (FIG. 7) where one or more elements that are associated with a primitive that is being rendered are interpolated. Flow continues to 809 where the interpolation operation is complete.

If W is a flat, and not equal to 1.0, no pre-multiply by W or post-multiply by W is needed because there is no perspective warping. If, however, pre-multiply by a flat 1/W is applied in the ISetup unit 314, then a post-multiply during interpolation is still needed. If W is flat, both pre-multiply and post-multiply can be removed, but both multiplies must be removed together or neither multiply can be removed. Only when W=1.0 can only one of the multiplies be removed. That is, only when W=1.0 can either the pre-multiply or the post-multiply be removed.

In an alternative embodiment, an additional condition that may be detected so that the flat optimization disclosed herein may be used includes detecting whether the coefficients for the plain equation for the attributes are constant (i.e., $A_j=0$, $B_j=0$, $C_j=$constant). No interpolation is needed for attributes determined to be constants, and no plane equations need to be generated for constant attributes. This converts to $A_j$*(x−seed·x)+$B_j$*(y−seed·y)+$C_j$ to the $C_j$ propagation. That is, $C_j$ values may be propagated through the interpolation pipeline from the plane equation table 317 as attribute values. In still another alternative embodiment, the flat W optimization disclosed herein may be used if all of the vertices of a primitive are the same, but not equal to 1.0.

Figure 9:
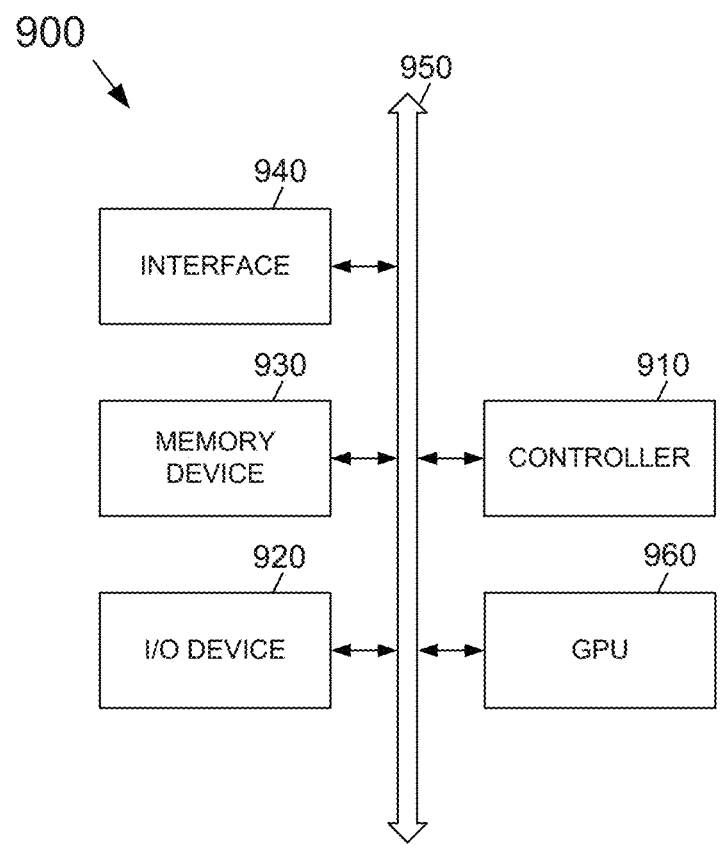
FIG. 9 depicts an electronic device that includes a graphics pipeline that may reduce the number of times when reciprocal, multiply or divide computations are used for interpolation computations when though the GPU hardware has been, for example, programmed to perform a linear-perspective interpolation.

FIG. 9 depicts an electronic device 900 that includes GPU 960 that includes a graphics pipeline that may reduce the number of times when reciprocal, multiply or add computations are used for interpolation computations when the GPU hardware 960 has been, for example, programmed to perform a linear-perspective interpolation. Electronic device 900 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 900 may include a controller 910, an input/output device 920 such as, but not limited to, a keypad, a keyboard, a display, a touch-screen display, a camera, and/or an image sensor, a memory 930, and an interface 940 that are coupled to each other through a bus 950. The controller 910 may include, for example, at least one microprocessor, at least one digital signal process, at least one microcontroller, or the like. The memory 930 may be configured to store a command code to be used by the controller 910 or a user data. Electronic device 900 and the various system components of the GPU 960 may include a graphic pipeline that may reduce the number of times when reciprocal, multiply or divide computations are used for interpolation computations when the GPU hardware 960 has been programmed to perform a linear-perspective interpolation. The interface 940 may be configured to include a wireless interface that is configured to transmit data to or receive data from a wireless communication network using a RF signal. The wireless interface 940 may include, for example, an antenna, a wireless transceiver and so on. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), and so forth.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices).

The operations described in this specification may be implemented as operations performed by a data-processing apparatus on data stored on one or more computer-readable storage devices or received from other sources.

The term "data-processing apparatus" encompasses all kinds of apparatus, devices and machines for processing data, including by way of example, a programmable processor, a computer, a system on a chip, or multiple ones, or combinations, of the foregoing The apparatus may include special-purpose logic circuitry, e.g., an FPGA (field programmable gate array) or an ASIC (application-specific integrated circuit). The apparatus may also include, in addition to hardware, code that creates an execution environment for the computer program, e.g., code that constitutes processor firmware, a protocol stack, a database-management system, an operating system, a cross-platform runtime environment, a virtual machine, or a combination thereof. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus can also be implemented as, special-purpose logic circuitry, e.g., an FPGA (field programmable gate array) or an ASIC (application-specific integrated circuit).

Processors suitable for the execution of a computer program include, by way of example, both general-purpose and special-purpose microprocessors, and any one or more processors of any kind of digital computer. Generally, a processor may receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer, however, need not have such devices. Moreover, a computer may be embedded in another device, e.g., a mobile telephone, a personal-digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special-purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, with which the user can provide input to the computer. Other kinds of devices can be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back-end component, e.g., as a data server, or that includes a middleware component, e.g., an application server, or that includes a front-end component, e.g., a user computer having a graphical user interface or a Web browser through which a user may interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include users and servers. A user and a server are generally remote from each other and typically interact through a communication network. The relationship of user and server arises by virtue of computer programs running on the respective computers and having a user-server relationship to each other.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method to interpolate one or more attributes of an element of a primitive being rendered in a graphics pipeline, the method comprising:
   determining that a homogeneous coordinate of the element is within a predetermined threshold of 1 based on a linear-perspective interpolation technique having been specified for rendering the primitive;
   interpolating the attributes of the element using a linear-interpolation technique based on the homogeneous coordinate of the element being within a predetermined threshold of 1; and
   interpolating the attributes of the element using a linear-perspective interpolation technique based on the homogeneous coordinate of the element being outside of the predetermined threshold of 1.

2. The method of claim 1, wherein the attributes of an element are further associated with a vertex of the primitive.

3. The method of claim 1, wherein determining whether the homogeneous coordinate of the element is within the predetermined threshold of 1 further comprises determining whether the homogeneous coordinate of each element of the primitive is equal to 1.

4. The method of claim 1, wherein the primitive comprises one of a triangle and a line.

5. The method of claim 1, wherein determining whether the homogeneous coordinate of the element is within the predetermined threshold of 1 comprises determining at one of an input and an output of a graphics pipeline stage whether the homogeneous coordinate of the element is within the predetermined threshold of 1.

6. The method of claim 5, wherein the graphics pipeline stage comprises one of a clip-cull-viewport unit, a setup unit, and an interpolation unit.

7. The method of claim 1, further comprising:
   determining whether a value of a homogeneous coordinate of the primitive is a constant that is not equal to 1 based on the linear-perspective interpolation technique having been specified for rendering the primitive;
   interpolating the attributes of the primitive using the linear-interpolation technique based on the value of the homogeneous coordinate being determined to be a constant that is not equal to 1; and
   interpolating the attributes of the primitive using the linear-perspective interpolation technique based on the value of the homogeneous coordinate being other than a constant that is not equal to 1.

8. The method of claim 1, further comprising:
   determining whether coefficients of a plane equation for attributes of the primitive are constant;
   interpolating the attributes of the primitive based on the coefficients of the plane equation being determined to not be constant; and
   omitting interpolating the attributes of the primitive based on the coefficients of the plane equation being determined to be constant.

9. A graphics pipeline stage, comprising:
   an input that receives one or more attributes of a primitive;
   a comparator that compares a value of a homogeneous coordinate of the attributes of the primitive to 1 to determine whether the value of the homogeneous coordinate is within a predetermined threshold of 1 based on a linear-perspective interpolation technique having been specified for rendering the primitive; and
   an interpolator that interpolates the attributes of the primitive using a linear-interpolation technique based on the value of the homogeneous coordinate being determined to be within the predetermined threshold of 1, and that interpolates the attributes of the primitive using the linear-perspective interpolation technique based on the value of the homogeneous coordinate being determined to be outside of the predetermined threshold of 1.

10. The graphics pipeline stage of claim 9, wherein the attributes of an element are further associated with a vertex of the primitive.

11. The graphics pipeline stage of claim 9, wherein the attributes are associated with a vertex of the primitive, and wherein the primitive comprises one of a triangle and a line.

12. The graphics pipeline stage of claim 9, wherein the comparator further determines whether the value of a homogeneous coordinate of a primitive is a constant that is not equal to 1 based on a linear-perspective interpolation technique having been specified for rendering the primitive, and
   wherein the interpolator further interpolates the attributes of the primitive using the linear-interpolation technique based on the value of the homogeneous coordinate being determined to be a constant that is not equal to 1, and that interpolates the attributes of the primitive using the linear-perspective interpolation technique based on the value of the homogeneous coordinate being other than a constant that is not equal to 1.

13. The graphics pipeline stage of claim 9, wherein the comparator further determines whether coefficients of a plane equation for attributes of the primitive are constant, and wherein the interpolator further interpolates the attributes of the primitive based on the coefficients of the plane equation being determined to not be constant, and omits interpolating the attributes of the primitive based on the coefficients of the plane equation being determined to be constant.

14. The graphics pipeline stage of claim 9, wherein graphics pipeline stage comprises one of a clip-cull-viewport unit, a setup unit, and an interpolation unit.

15. A graphics processing unit, comprising:

a graphics pipeline stage comprising:

an input that receives one or more attributes of a primitive;

a comparator that determines whether a value of a homogeneous coordinate of a primitive is a constant that is not equal to 1 based on a linear-perspective interpolation technique having been specified for rendering the primitive; and an interpolator that interpolates the attributes of the primitive using a linear-interpolation technique based on the value of the homogeneous coordinate being determined to be a constant that is not equal to 1, and that interpolates the attributes of the primitive using the linear-perspective interpolation technique based on the value of the homogeneous coordinate being other than a constant that is not equal to 1; and a shader that receives an output of the interpolator and renders the primitive.

16. The graphics processing unit of claim 15, wherein the comparator further compares the value of the homogeneous coordinate of the attributes of the primitive to 1 to determine whether the value of the homogeneous coordinate is within a predetermined threshold of 1 based on a linear-perspective interpolation technique having been specified for rendering the primitive, and wherein the interpolator further interpolates the attributes of the primitive using the linear-interpolation technique based on the value of the homogeneous coordinate being determined to be within the predetermined threshold of 1, and that interpolates the attributes of the primitive using the linear-perspective interpolation technique based on the value of the homogeneous coordinate being determined to be outside of the predetermined threshold of 1.

17. The graphics processing unit of claim 15, wherein the primitive comprises one of a triangle and a line.

18. The graphics processing unit of claim 15, wherein the attributes of an element are further associated with a vertex of the primitive.

19. The graphics processing unit of claim 15, wherein the comparator further determines whether coefficients of a plane equation for attributes of the primitive are constant, and wherein the interpolator further interpolates the attributes of the primitive based on the coefficients of the plane equation being determined to not be constant, and omits interpolating the attributes of the primitive based on the coefficients of the plane equation being determined to be constant.

20. The graphics processing unit of claim 15, wherein graphics pipeline stage comprises one of a clip-cull-viewport unit, a setup unit and an interpolation unit.

* * * * *